(12) United States Patent
Szajnowski

(10) Patent No.: US 7,408,499 B2
(45) Date of Patent: Aug. 5, 2008

(54) GENERATIONS OF SEQUENCES OF WAVEFORMS

(75) Inventor: Wieslaw Jerzy Szajnowski, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 200 days.

(21) Appl. No.: 10/563,132

(22) PCT Filed: Jul. 6, 2004

(86) PCT No.: PCT/GB2004/002931

§ 371 (c)(1),
(2), (4) Date: Jun. 12, 2006

(87) PCT Pub. No.: WO2005/006014

PCT Pub. Date: Jan. 20, 2005

(65) Prior Publication Data
US 2006/0244653 A1    Nov. 2, 2006

(30) Foreign Application Priority Data
Jul. 7, 2003   (EP) ................................. 03254298

(51) Int. Cl.
*G01S 13/93* (2006.01)
(52) U.S. Cl. .................... 342/70; 342/108; 342/145; 342/189; 342/204; 701/301; 340/435; 340/436; 340/903
(58) Field of Classification Search ............ 342/70–72, 342/108, 115, 128–137, 145, 189, 195, 200–204; 340/903, 435, 436; 701/301
See application file for complete search history.

(56) References Cited

U.S. PATENT DOCUMENTS

| 3,475,558 A |   | 10/1969 | Cahn |
| 3,819,920 A | * | 6/1974 | Goldfischer ................. 342/109 |
| 4,044,356 A |   | 8/1977 | Fournier |
| 5,291,202 A |   | 3/1994 | McClintock |
| 5,442,359 A | * | 8/1995 | Rubin ........................ 342/109 |

(Continued)

FOREIGN PATENT DOCUMENTS

EP    0 919 835 A2    6/1999

(Continued)

OTHER PUBLICATIONS

Baden J M et al., Proceedings of the National Telesystems conference. Atlantic, Mar. 26, 1991, vol. 1, pp. 127-131.

(Continued)

*Primary Examiner*—John B Sotomayor
(74) *Attorney, Agent, or Firm*—Birch, Stewart, Kolasch & Birch, LLP

(57) ABSTRACT

A sequence of waveforms is generated by producing a primary symbol sequence and, for each symbol within the sequence, substituting a randomly-selected waveform. The primary symbol sequence has a narrow autocorrelation function, and may be a train of pulses, with the pulses arranged in packets of predetermined configuration. Objects can be detected by transmitting the waveforms, forming a representation of the transmitted waveform and delaying that representation, and correlating the representation with signals received as a result of reflection of the transmitted waveforms.

18 Claims, 6 Drawing Sheets

U.S. PATENT DOCUMENTS

| | | | |
|---|---|---|---|
| 5,451,961 A * | 9/1995 | Rubin et al. | 342/159 |
| 5,583,505 A * | 12/1996 | Andersen et al. | 342/13 |
| 5,847,677 A | 12/1998 | McCorkle | |
| 6,225,943 B1 * | 5/2001 | Curley et al. | 342/137 |
| 6,392,588 B1 * | 5/2002 | Levanon | 342/202 |
| 6,614,833 B2 * | 9/2003 | Ozluturk | 375/140 |
| 7,280,587 B2 * | 10/2007 | Motoyoshi et al. | 375/150 |
| 2005/0261834 A1 * | 11/2005 | Szajnowski et al. | 701/301 |
| 2006/0244653 A1 * | 11/2006 | Szajnowski | 342/70 |

FOREIGN PATENT DOCUMENTS

| | | | |
|---|---|---|---|
| EP | 1496371 A1 * | 1/2005 | |
| EP | 1777545 A1 * | 4/2007 | |
| GB | 935 694 A | 9/1963 | |
| GB | 2 317 763 A | 4/1998 | |
| JP | 09258787 A * | 10/1997 | |
| JP | 2004037442 A * | 2/2004 | |
| WO | WO-00/79299 A1 | 12/2000 | |

OTHER PUBLICATIONS

Spano E et al., IEEE Transactions on Geoscience and Remote Sensing, IEEE Inc. New York, US, vol. 34, No. 2, Mar. 1, 1996, pp. 317-329.

* cited by examiner

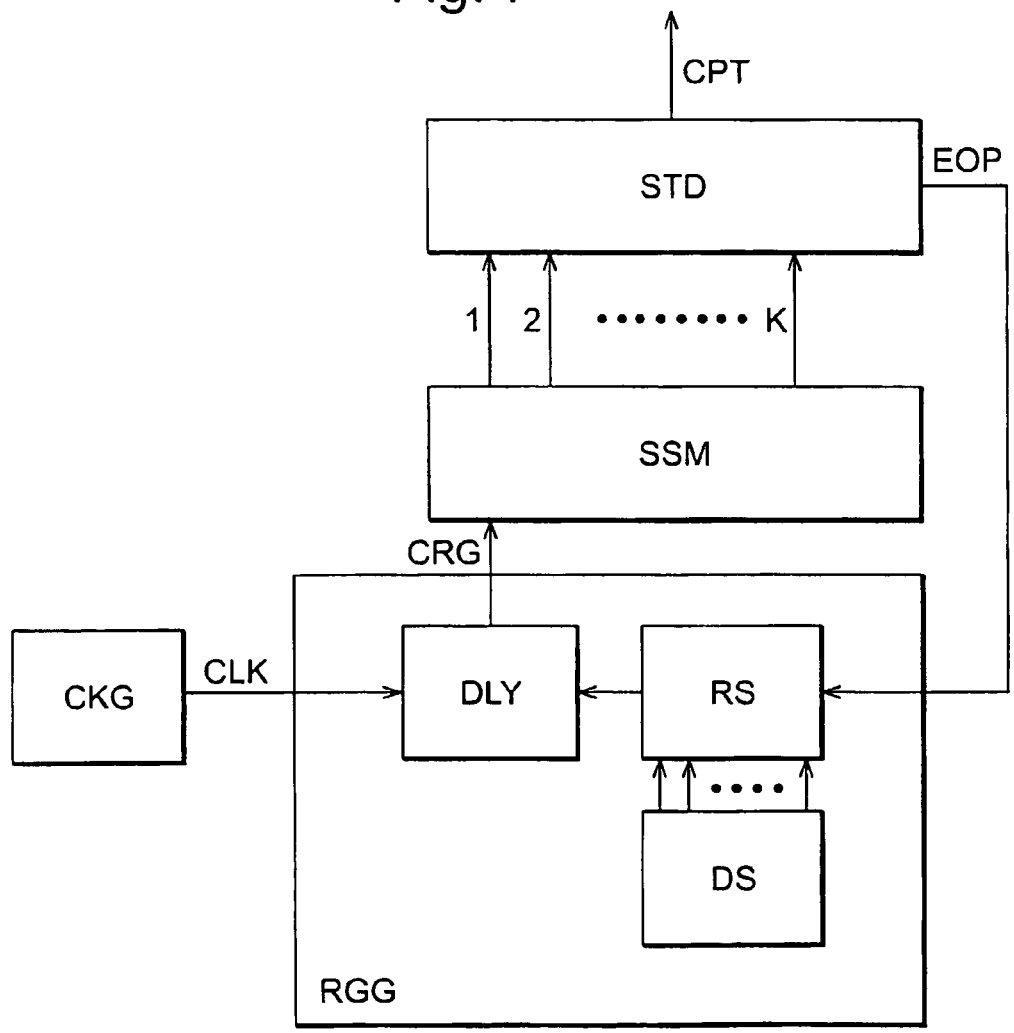

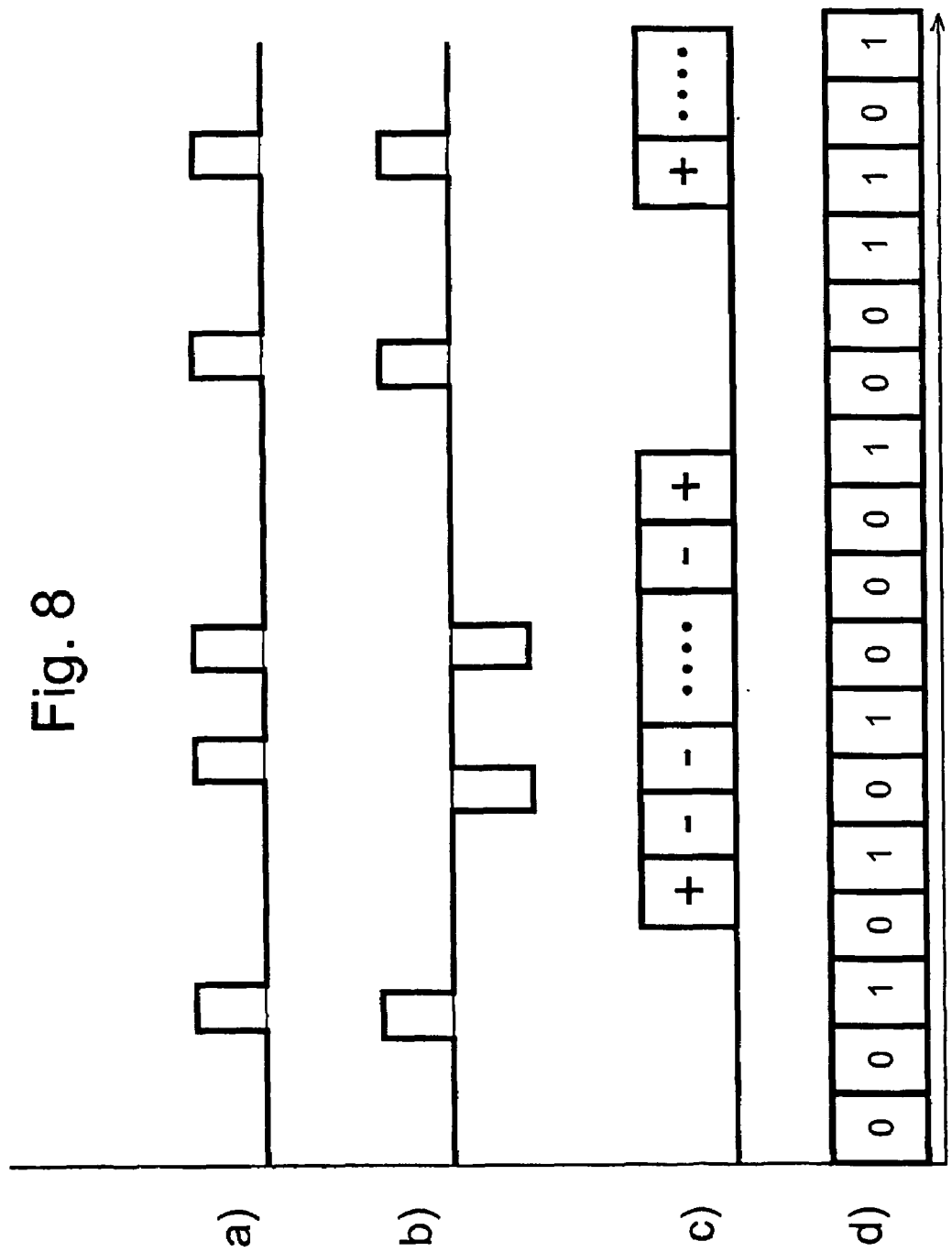

GENERATIONS OF SEQUENCES OF WAVEFORMS

FIELD OF THE INVENTION

This invention relates to a method and apparatus for generating sequences of waveforms, for example to be utilized in obstacle-detection systems and particularly, but not exclusively, in automotive blind-spot or pre-crash warning systems designed to operate in multi-user environments.

BACKGROUND OF THE INVENTION

One important type of automotive blind-spot or pre-crash warning system employs short pulses of electromagnetic or ultrasonic energy to interrogate the detection zone. A decision regarding the presence or absence of an obstacle at a predetermined range is then made by suitably processing energy backscattered by various objects in the field of view of the system. A detection apparatus can be arranged to detect whether a reflected pulse appears at a particular delay (corresponding to the predetermined range) after the interrogation pulse has been transmitted. Instead of just detecting the occurrence of reflected pulses, the analog values of the signal received after each pulse transmission can be integrated, to provide an arrangement which is sensitive to backscattered signal strength, and thus capable of better performance. A multichannel detection apparatus has several channels, each with a different delay, for detecting objects at different range values of interest.

It is known that object detectability can be improved significantly when each single pulse is replaced by a suitably-constructed pulse packet. Each pulse packet comprises a specified number N of identical pulses which are staggered nonuniformly, with each interpulse spacing being an integer multiple of a suitably chosen unit time interval. The pattern of interpulse spacings is so designed as to ensure that only a small number ha of pulse coincidences (preferably at most one pulse coincidence) will occur between a primary pulse packet and its replica shifted in time by more than one pulse duration. This condition is usually referred to as the autocorrelation constraint.

Consider a pulse packet of span (length) L comprising N identical rectangular pulses of unit duration. Such a pulse packet can be conveniently represented by a binary sequence $\{x\}=x_1 x_2 \ldots x_L$ of symbols 0 and 1, in which symbol 1 corresponds to pulse occurrence. In this case, the autocorrelation constraint can be expressed as $$R_{xx}(d) = \sum_{i=1}^{L-d} x_i x_{i+d} \le h_a < N, \quad 0 < d \le L-1$$

where $R_{xx}(d)$ is the autocorrelation sequence and d is the integer shift. When d=0, the autocorrelation value $R_{xx}(0)$ simply equals the number N of pulses contained within the pulse packet.

In the class of all pulse packets with a specified number of pulses N and $h_a=1$, a maximally compact pulse packet has the minimal span $L_{min}$. Consequently, the maximally compact pulse packet exhibits the largest duty factor, N/L, hence the largest average power. For a fixed N and $h_a=1$, all pulse packets with spans greater than $L_{min}$ are referred to as sparse pulse packets.

The autocorrelation constraint ensures that when there is no noise or interference, and a multichannel pulse-coincidence processor is used for detecting a pulse packet, the output of each channel is at most $h_a$ except when the channel delay matches that of a pulse packet being received. In this case, the channel output reaches the peak value of N.

In a multi-user environment, the users may transmit their signals simultaneously and asynchronously so that not only must each receiver recognize and detect its own transmitted signal, but it must be able to do so in the presence of the other transmitted signals. Assume that a pulse packet to be detected by a receiver of interest is represented by a binary sequence $$\{x\}=x_1 x_2 \ldots x_L$$

and that one of the interfering pulse packets is represented by another binary sequence $$\{y\}=y_1 y_2 \ldots y_L$$

In order to optimize the detection performance of the receiver in multi-user environment, the following cross-correlation constraints must be satisfied for all integer shifts d $$R_{xy}(d) = \sum_{i=1}^{L-d} x_i y_{i+d} \le h_c < N, \quad 0 \le d \le L-1 \text{ and}$$

$$R_{yx}(d) = \sum_{i=1}^{L-d} y_i x_{i+d} \le h_c < N, \quad 0 \le d \le L-1$$

When more than one transmitter is in operation, the autocorrelation and cross-correlation constraints combined together ensure that when there is no noise and a multichannel pulse-coincidence processor is used for detection, the output of each channel is still substantially less than N except when the channel delay matches that of a received pulse packet of interest.

In automotive applications, many similar obstacle-detection systems should be capable of operating in the same region, and sharing the same frequency band. To avoid mutual interference, each system should use a distinct signal, preferably uncorrelated with the signals employed by all other systems. Because it is not possible to predict which of the many similar systems will be operating in a particular environment, it is not practical to assign a distinct binary sequence to each of them. Furthermore, it is also very difficult to construct large sets of binary sequences with good autocorrelation and cross-correlation properties, and also exhibiting acceptable duty factors.

European Patent Application No. EP-A-1330031 (referred to herein as "the earlier application", and the contents of which are incorporated herein by reference) discloses a method which exploits random mechanisms to generate large sets of composite pulse trains that can satisfy both autocorrelation and cross-correlation constraints. Consequently, resulting composite pulse trains will exhibit an excellent resistance to mutual jamming in multi-user environments. It is also possible to produce sequences exhibiting a high duty factor, thus enhancing the resulting detection performance.

According to the method disclosed in the earlier application, a composite pulse train consists of a sequence of primary pulse packets each of which is drawn at random from a predetermined set of suitably constructed primary pulse packets with prescribed autocorrelation and cross-correlation properties. The autocorrelation function of each primary pulse packet exhibits the property of 'at most one coincidence'. Also, the cross-correlation function between any two different pulse packets assumes small values compared to the maximum value of the corresponding autocorrelation functions. Furthermore, the resistance to mutual jamming in multi-user environments can be further improved by separating individual primary pulse packets by gaps of random duration, the value of which may be determined by a random value supplied by a random number generator. FIG. 1 depicts the structure of such constructed composite pulse trains.

As a result, although each user may have the same set of primary pulse packets, a composite pulse train transmitted by each user is assembled in a random manner and is, therefore, statistically unique.

Although the method disclosed in the earlier application offers a practical solution to the problem of alleviating the mutual interference effects in a multi-user environment, the method is not capable of increasing the ratio R of the peak autocorrelation value, $R_{xx}(0)=N$, to the maximum (unit) autocorrelation sidelobe value. Increasing the value of R would improve the capability of the obstacle-detection system to detect and discriminate smaller obstacles (such as motorbikes) located in proximity of larger obstacles (such as trucks).

It would therefore be desirable to provide a method for generating a large number of pulse trains with good autocorrelation properties, good cross-correlation properties, and also improved capability to discriminate between multiple smaller and larger obstacles, especially for applications in systems intended to operate in a multi-user environment.

DESCRIPTION OF THE INVENTION

Aspects of the present invention are set out in the accompanying claims.

In accordance with another aspect of the invention, a primary symbol sequence having a narrow autocorrelation function (i.e. an autocorrelation function which, for all non-zero shifts, has a value which is substantially smaller than the maximum value at zero shift) is chosen, and each symbol of the sequence is replaced (substituted) by a waveform, drawn at random from a set comprising a finite number of suitably chosen waveforms of finite duration. Preferably, the waveforms should have the same duration and be mutually orthogonal (uncorrelated) to facilitate their discrimination in the receiver.

For clarity, the invention will primarily be described in the context of arrangements wherein the primary symbol sequence is a train of discrete pulses, and the pulses are arranged in predetermined packets (although neither of these features is essential, as will be described). The mechanism of representing a pulse by a randomly selected waveform may be viewed as some form of random pulse mapping.

When M orthogonal waveforms are utilized for pulse mapping, a single pulse packet containing N pulses may be represented by as many as $M^N$ waveform packets, all packets conveying the same time information, yet being different, hence distinguishable in the receiver.

The operation of random pulse mapping retains the time information contained in the pulse-to-pulse intervals, and random pulse mapping itself is equivalent to assigning to each pulse an index selected at random from a set of integers. Those indices may be represented in a physical system in a variety of different ways (for example, by the frequencies of the waveforms).

When no random mapping is applied to a pulse packet comprising N pulses with the property 'at most one coincidence', the ratio R of the peak autocorrelation value $R_{xx}(0)$ to the maximum (unit) autocorrelation sidelobe value is just N. However, when M orthogonal waveforms are utilized for random pulse mapping, the unit sidelobe value will, on average, be reduced to 1/M. This effect follows from the fact that the requirement of pulse coincidence 'in time' is now combined with the requirement of equality of indices (additional coincidence) assigned to individual pulses. As a result, the average value of the ratio R will be increased to NM, and an improved discrimination between large and small obstacles will be obtained.

Random pulse mapping, even if used on its own, provides an excellent resistance to mutual jamming in a multi-user environment. By construction, although each user may employ repeatedly the same primary symbol sequence (e.g. a primary pulse packet), the corresponding sequence of waveforms is assembled in a random manner by each user and is, therefore, statistically unique. The resistance to mutual jamming in a multi-user environment can be further improved by inserting random gaps between individual packets in accordance with the method described above and disclosed in the earlier application. The techniques disclosed in GB-A-2357610 could be used to determine the durations of the gaps.

In some obstacle-detection systems, the peak power of transmitted waveforms is limited and cannot be increased, yet attaining reliable detection coupled with high range resolution is of primary importance. In such cases, a set of orthogonal waveforms used for random pulse coding should contain waveforms which can be compressed in the receiver, and their duration on transmit could be increased up to $(Z+1)\Delta$, where $Z\Delta$ is the shortest interval between primary signals in a packet. The use of 'compressible' waveforms for random pulse mapping will increase the resulting duty factor, by a factor of up to $(Z+1)$, which otherwise may be too low for intended applications.

A broad class of compressible waveforms include sine waves, and transient signals with linear frequency modulation, commonly referred to as LFM, or 'chirp', pulses, and other waveforms known to those skilled in the art.

As described in the earlier application, a primary pulse packet with desired autocorrelation properties can be used to construct another primary pulse packet with the same auto-correlation properties by reversing in time the first primary pulse packet. The cross-correlation function between these two dual primary pulse packets will not exceed values greater than two. In a preferred aspect of the present invention, a pulse packet with a larger duty factor may be formed by basing the packet on an underlying binary pulse sequence formed by suitably interleaving a first pulse packet and its time-reversed ('mirror') replica. In such a case, preferably, one set of waveforms will be employed for mapping the first pulse packet, and another set of waveforms will be used for mapping the 'mirror' replica of the first packet. Preferably, the two sets of waveforms are mutually exclusive, i.e., no waveform may belong to both the sets. As a simple example, the waveforms used for the primary packet may have a first frequency, and those for the mirror replica may have a second frequency. It is preferred, however, for each packet to comprise several different waveforms.

According to a further preferred aspect of the invention, a pulse packet is constructed in such a way as to satisfy the autocorrelation constraint modified as follows $$R_{xx}(d) = \sum_{i=1}^{L-d} x_i x_{i+d} = 0, \quad 0 < d \leq Z$$

-continued $$R_{xx}(d) = \sum_{i=1}^{L-d} x_i x_{i+d} \leq 1, \quad Z < d \leq L-1$$

where the pulse packet is represented by a binary sequence $\{x_1, x_2 \ldots x_L\}$ of symbols 0 and 1, in which symbol 1 corresponds to pulse occurrence.

The above constraint is more restrictive than the 'at most one coincidence' requirement, because for all consecutive delay values d=1, 2, . . . , Z, the autocorrelation sequence $R_{xx}(d)$ must equal zero. Therefore, the resulting autocorrelation sequence $R_{xx}(d)$ will exhibit a zero-correlation zone of span Z on either side of the main peak of value N at d=0.

When the duration of a single pulse equals Δ, the zero-correlation zone will correspond to the relative distance ZCD between obstacles equal to ZcΔ/2, where c is the speed of interrogating pulses (c is the speed of light for electromagnetic pulses).

Consequently, an obstacle-detection system utilizing pulse packets satisfying the modified autocorrelation constraint will have an improved obstacle resolution, because the sidelobes of the autocorrelation function corresponding to a larger obstacle (such as truck) will no longer obscure the main autocorrelation peak associated with a smaller obstacle (such as motorbike) located within the relative distance ZCD from a larger obstacle.

From the modified autocorrelation constraint, it follows that in order to obtain the zero-correlation zone of span Z, the minimum difference between any two pulse positions in the pulse packet cannot be less than (Z+1).

Using this aspect of the invention, the improved discrimination between large and small obstacles achieved as a result of random pulse mapping is further enhanced.

Combining the aspects mentioned above, i.e. the modified autocorrelation constraint (leading to an extended zero-correlation zone) and the statistical sidelobe reduction, obtained from random pulse mapping, results in the following set of packet properties:

1. autocorrelation peak N $$R_{xx}(0) = \sum_{i=1}^{L} x_i^2 = N$$

2. zero-correlation zone $$R_{xx}(d) = \sum_{i=1}^{L-d} x_i x_{i+d} = 0, \quad 0 < d \leq Z$$

3. statistical sidelobe reduction via random pulse mapping $$R_{xx}(d) = \sum_{i=1}^{L-d} x_i x_{i+d} \leq 1/M < 1, \quad Z < d \leq L-1$$

where the statistical bound 1/M on the sidelobe values can be satisfied in the 'long run' or 'on average'. Since in practical applications a decision regarding the presence or absence of an obstacle at a given range may be based on several thousand pulse packets, the bound 1/M is effectively achievable.

The primary symbol sequence may comprise identical pulses interspersed with gaps. In this case, the timing of the pulses is such that a narrow autocorrelation sequence is obtained. Alternatively, the primary symbol sequence may comprise different types of symbols (e.g. a binary sequence in which symbols −1 and 1 represent different polarity pulses, or a ternary sequence, etc.). In this case, the autocorrelation sequence may have a narrow structure due to the use of distinctive symbols, in addition to the timing of those symbols. Accordingly, to preserve this information, the random pulse mapping preferably uses different sets of waveforms for the different symbol types, the waveforms of each set generally being distinguishable from those of the other sets. A specific example of this possibility is the interleaving of a pulse packet with its 'mirror'-reversed replica, mentioned above.

DESCRIPTION OF THE DRAWINGS

An arrangement embodying the invention will now be described by way of example with reference to the accompanying drawings, in which:

FIG. 7 is a block diagram of a pulse packet generator of the system of FIG. 6; and FIG. 8 shows different types of primary symbol sequences.

DESCRIPTION OF A PREFERRED EMBODIMENT

The structure of a system according to the present invention will be described below. First, reference will be made to the types of interrogation signals which can be used in such a system.

Figure 1:
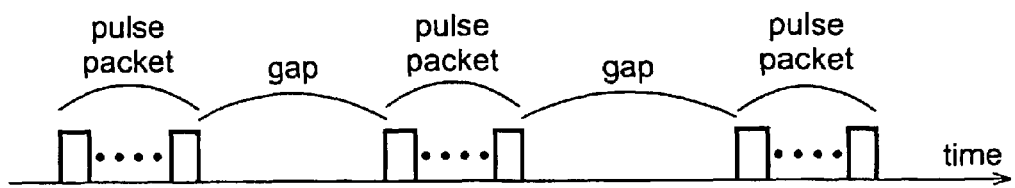
FIG. 1 depicts the structure of a composite pulse train.
Figure 2:
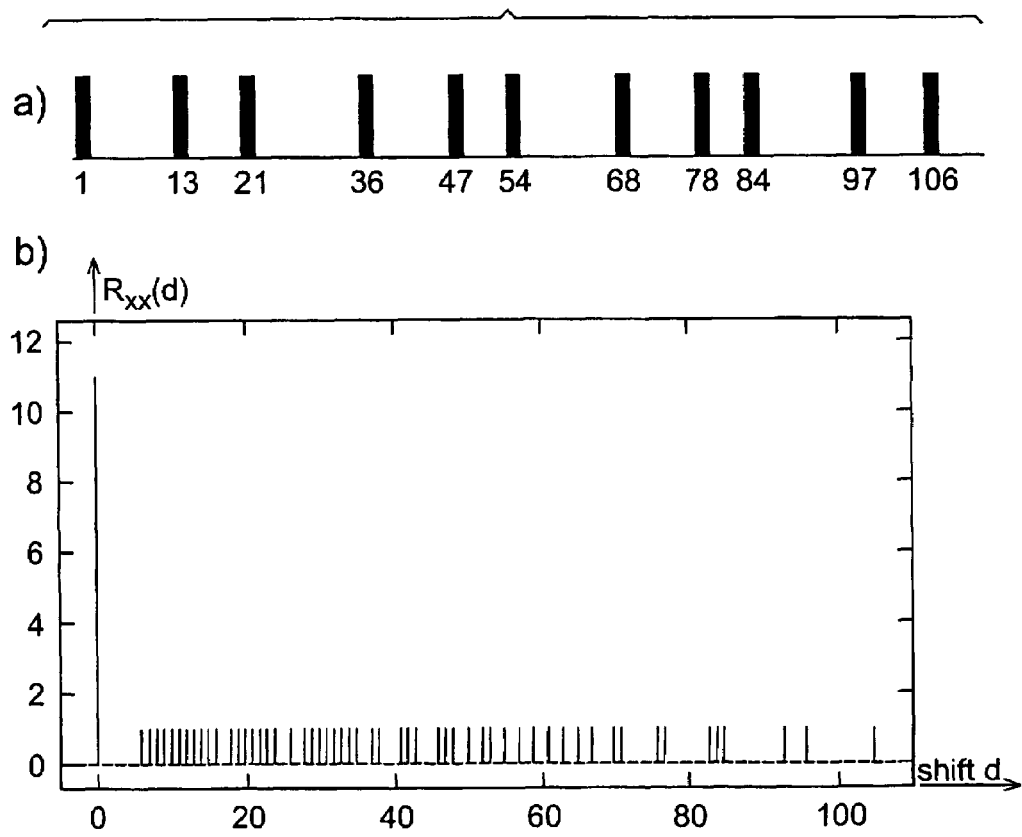
FIG. 2(a) is an example of a pulse packet.
FIG. 2(b) depicts the autocorrelation sequence of a binary sequence representing the pulse packet of FIG. 2(a)

FIG. 2(a) shows an example of a primary pulse packet which could be used to derive interrogation signals used by an obstacle-detection system according to the present invention. The packet comprises 11 pulses distributed within 106 positions; the minimum difference between pulse positions in the packet is equal to 6 (positions 78 and 84). FIG. 2(b) depicts the autocorrelation sequence of the packet. The packet satisfies the modified autocorrelation constraint mentioned above. In accordance with the packet construction, the zero-correlation zone has a span of 5.

Randomly selected waveforms are substituted for the individual pulses. In the simplest arrangement, the duration of each waveform used for random pulse mapping equals Δ, i.e., the duration of each primary pulse.

Figure 3:
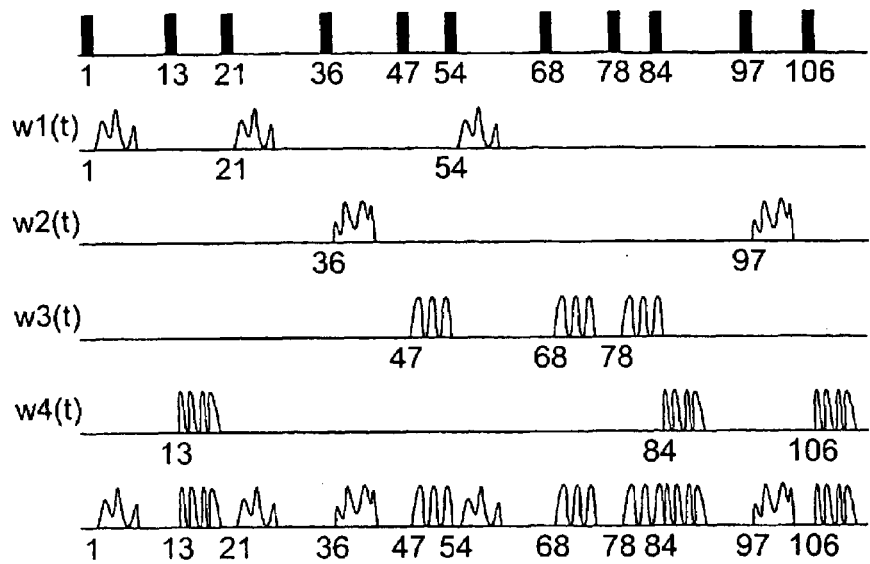
FIG. 3 illustrates the principle of random pulse mapping.

FIG. 3 illustrates a primary pulse packet (the same as already shown in FIG. 2(a)) and a resulting waveform packet obtained by selecting one of four available waveforms, w1(t), w2(t), w3(t) and w4(t), indexed by numbers 1, 2, 3 and 4. In this case, the waveforms are significantly longer than the pulses of the basic pulse packet. For illustrative purposes, it is assumed that a random mechanism employed for waveform selection has produced the following sequence of numbers: 1, 4, 1, 2, 3, 1, 3, 3, 4, 2, 4. As seen, the primary pulse packet and the resulting waveform packet, being aligned in time, both contain the same time information.

Figure 4:
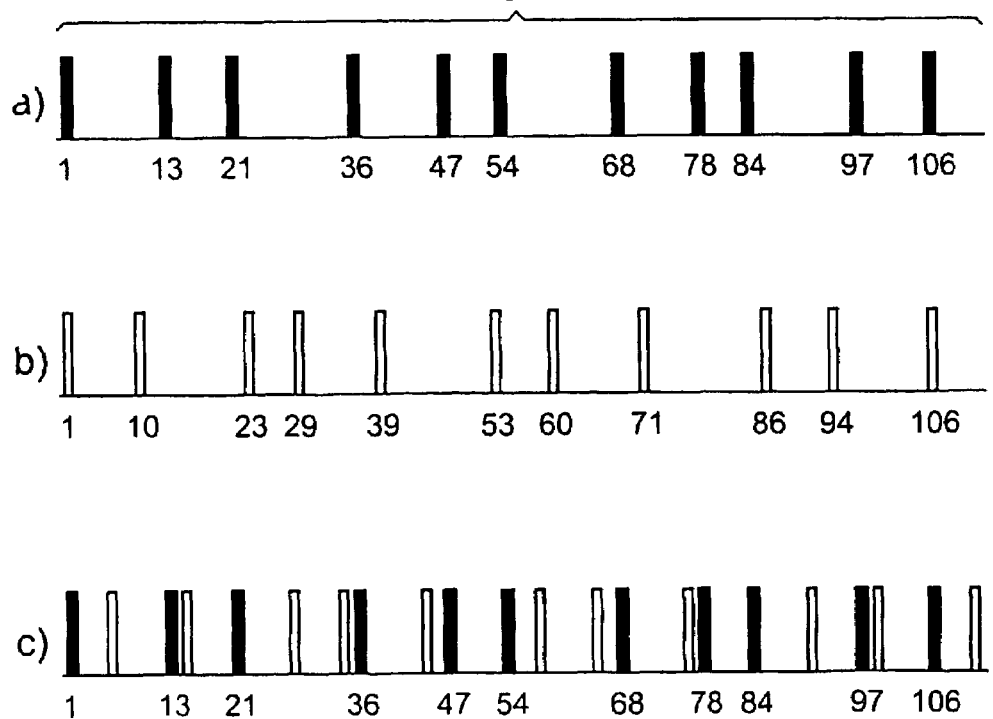
FIG. 4 is an example of a pulse packet with increased duty factor.

In order to improve the duty factor, the basic pulse packet can be modified. As an illustrative example, FIG. 4(a) shows the a first pulse packet which is the same as the primary pulse packet of FIG. 2(a), FIG. 4(b) shows a 'mirror' replica of the packet, and FIG. 4(c) depicts a pulse packet resulting from interleaving the first packet with a time-shifted 'mirror' replica of the packet. Again, in practice, waveforms are used in place of the discrete pulses. As indicated above, it is important for at least a substantial number of the waveforms representing each packet to be distinguishable from those representing the other packet (and desirable for them to be distinguishable from each other). To achieve this, preferably two sets of waveforms are used, random selections from the first set being substituted for pulses of the first packet, and random selections from the second set being substituted for pulses of the 'mirror' replica packet.

The duty factor of a pulse packet can be increased even more, if a supplementary packet (or packets) with the property 'at most one coincidence' is inserted into the combination of a primary packet and its 'mirror' replica. However, more sets of waveforms will be required for random mapping of pulses belonging to all interleaved packets.

Figure 5:
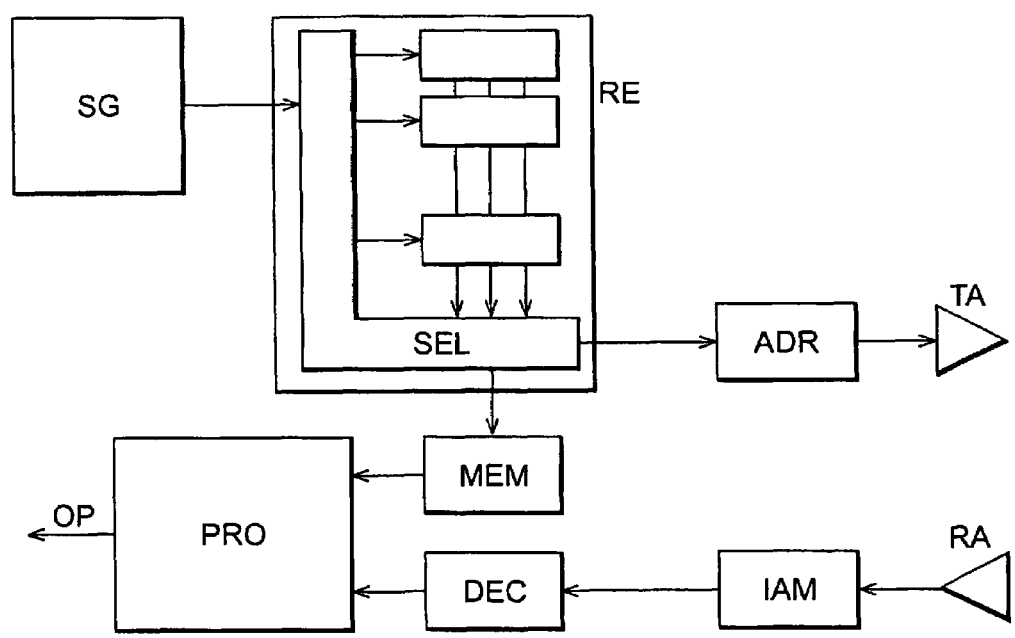
FIG. 5 is a block diagram of an obstacle-detection system.

FIG. 5 is a block diagram of an obstacle-detection system in accordance with the invention. The system includes a symbol generator SG which generates a sequence of symbols and provides these to a random encoder RE. The random encoder substitutes a randomly-selected waveform for each symbol, and delivers the waveforms in succession to an antenna driver ADR coupled to a suitable transmit antenna TA.

The random decoder RE includes waveform set generators WS1, WS2, ... WSJ, each capable of generating a respective set of waveforms. The generators may be simply memories storing the waveforms. The waveforms within each set are mutually orthogonal, and are mutually orthogonal with respect to the waveforms in the other sets. The random encoder also includes a selector SEL. The selector SEL determines a symbol value corresponding to the type of each symbol received from the symbol generator SG, and in response thereto selects a corresponding one of the waveform stores WS1, WS2, ... WSJ. The selector SEL also randomly selects an index value, uses this to choose one of the waveforms stored in the selected waveform store and outputs this to the antenna driver ADR.

The random encoder RE also sends information identifying the randomly-selected waveforms to a memory MEM. Preferably, the stored data includes the symbol value representing the symbol received from the symbol generator SG and the random index value.

A suitable receive antenna RA is connected to an input amplifier IAM. Received signals are provided by the amplifier IAM to a decoder DEC which determines which waveforms are received and generates index values representing those waveforms. In a preferred embodiment, the decoder DEC comprises a number of banks of matched filters, each corresponding to a respective set of waveforms. The decoder DEC generates an index value representing the particular filter within the bank which provides an output, and a symbol value indicating which bank the filter belongs to.

A processor PRO receives the output values from the decoder DEC and output values from the memory MEM, the output values from memory MEM being delayed by an amount dependent on the range being investigated. These values enable the processor PRO to detect matches between the sequence of transmitted waveforms and the received signals and thereby generate an output indicating that an obstacle has been detected. Preferably, the processor PRO checks for a match between the index values provided by the memory MEM and the decoder DEC, and where there is a match, inputs the respective symbols provided by the memory MEM and decoder DEC to a correlator. The output of the correlator is integrated, and the resultant value is indicative of the likelihood that an object is present at a particular range. The operation can be repeated for different ranges, by using different delay values.

Figure 6:
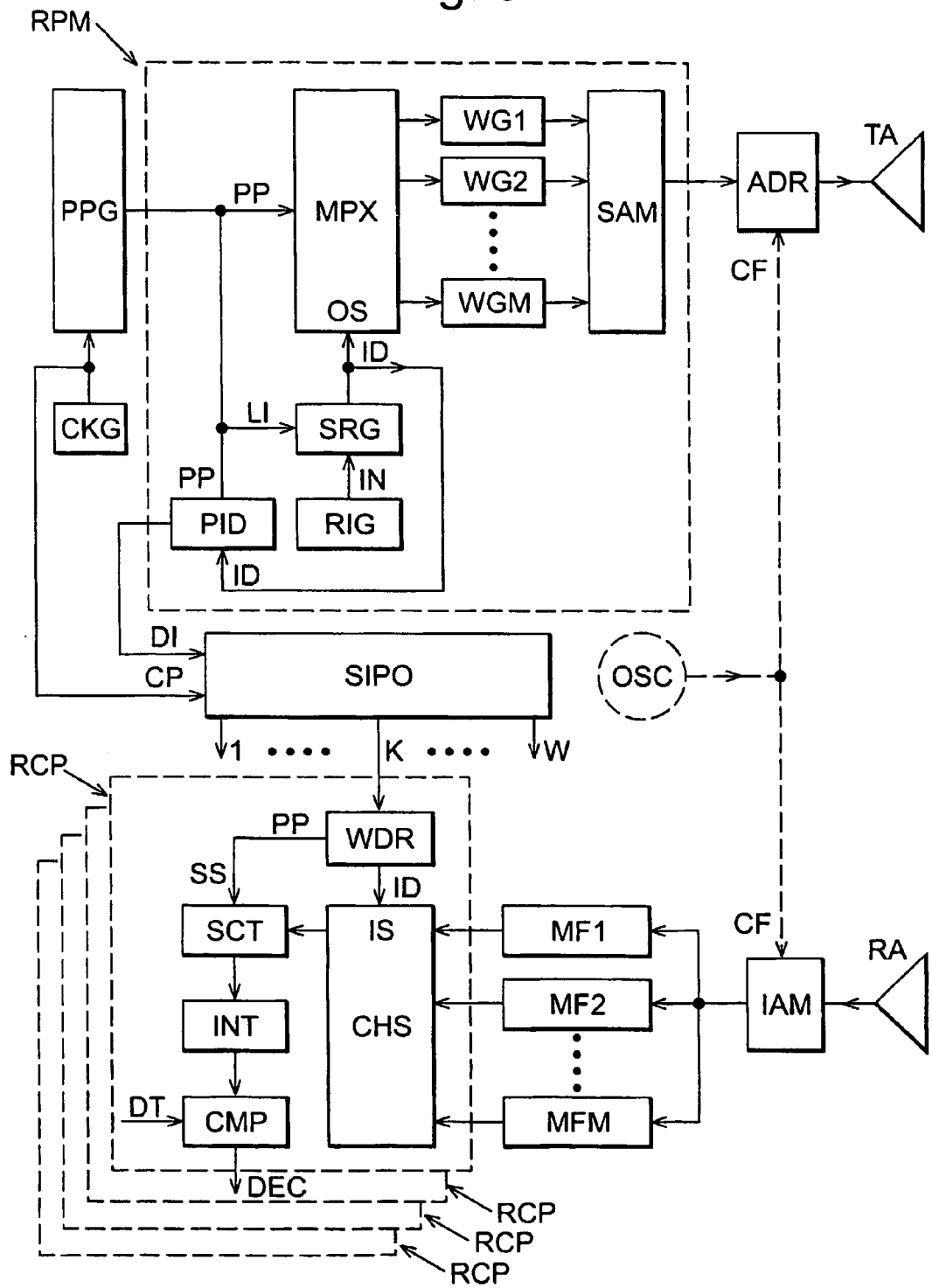
FIG. 6 is a more detailed block diagram of one implementation of the system of FIG. 5 incorporating a random pulse mapper arranged to operate in accordance with the present invention.

FIG. 6 shows a more detailed block diagram of one particular form of obstacle-detection system. In FIG. 6, the symbol generator SG is implemented as a pulse packet generator PPG, driven by a clock generator CKG. The random encoder is implemented as a random pulse mapper RPM. The memory MEM is implemented using a serial-in-parallel-out shift register SIPO. The decoder DEC is implemented by a bank of M matched filters MF1, MF2, ..., MFM. The processor PRO is implemented by a plurality of range-cell processors RCPs.

As will be explained later, the system may also incorporate an oscillator OSC supplying a sinusoidal signal at a suitable carrier frequency to both the antenna drive ADR and the input amplifier IAM.

The pulse packet generator PPG supplies repeatedly pulses to the random pulse mapper RPM, and more specifically to: input PP of a multiplexer MPX, load input LI of a storage register SRG, and input PP of a pulse identifier PID (which collectively correspond to the selector SEL of FIG. 5). The system of FIG. 6 is intended for use with pulse packets containing identical pulses, such as shown in FIG. 2(a). Accordingly, because the pulses are identical, only one set of waveforms is required. This set is provided by M waveform generators, WG1, WG2, ..., WGM. (To handle pulse sequences with distinguishable pulses (such as shown in FIG. 4(c), one or more additional sets of waveform generators would be provided.)

Each pulse supplied by the generator PPG triggers one out of the M waveform generators in response to the value of a number generated by a random index generator RIG. This value is loaded via input IN to a storage shift register SRG prior to the time instant of each pulse occurrence.

Preferably, waveforms $w1(t)$, $w2(t)$, ..., $wM(t)$ to be supplied by the M waveform generators WG1, WG2, ..., WGM should be mutually orthogonal to facilitate the discrimination of signals reflected back by obstacles. In particular, a suitable set of waveforms can be produced by using short segments of sine waves, each with substantially different frequency. In this specific case, the bank of matched filters will comprise band-pass filters, each with a centre frequency equal to the frequency of a respective sine wave, and with the bandwidth inversely proportional to the duration of the sine wave segment.

Short segments of sine waves can readily be generated by suitably modified ringing or blocking oscillators. Another method, disclosed in U.S. Pat. No. 3,612,899 (incorporated herein by reference), enables forming very narrow pulses of electromagnetic energy directly at microwave carrier frequency.

The value of a random index ID held at input OS of multiplexer MPX determines a specific path for each pulse to trigger the respective waveform generator corresponding to that index value. For example, when the index value is 2, waveform generator WG2 will be triggered to produce a suitable waveform $w2(t)$, which (via a summing amplifier SAM and driver ADR coupled to antenna TA) will be sent as an interrogating signal towards obstacles.

When waveforms produced by the waveform generators WG1, WG2, ..., WGM, are generated at a suitable carrier frequency (or frequencies), they can (after suitable conditioning and, if required, amplification in driver ADR) be sent directly by antenna TA as interrogating signals. However, when the waveform generators, WG1, WG2, ..., WGM, can supply only baseband versions of waveforms, some form of 'upconverting' (modulation) will be required prior to delivering those waveforms to the transmit antenna TA. In such a case, the antenna driver ADR will incorporate a suitable modulator utilizing a sinusoidal reference signal at a carrier frequency, provided by the auxiliary oscillator OSC, and applied via input CF to the driver ADR.

For each pulse provided by generator PPG, the pulse identifier PID combines a random index ID, assigned to that pulse (by the random index generator RIG), with timing information (supplied via input PP) regarding the pulse occurrence. The resulting combination may be represented by a binary word; for example, the most significant bit (MSB) equal 1 may mark the pulse occurrence, whereas the remaining bits may represent the value of the random index ID assigned to that pulse.

Binary words thus created are applied via input DI to register SIPO; the words are shifted into register SIPO at the time instants determined by clock pulses appearing at input CP of the register SIPO. As a result, each pulse supplied by the pulse packet generator PPG is represented by a respective binary word in a unique way: the time of pulse occurrence has been imparted on a corresponding time slot (i.e. clock period) by setting MSB to 1, whereas the random index ID has been used to determine the values of the remaining bits of the binary word.

The register SIPO acts as a digital discrete-time delay line with total delay (expressed in units of clock period) equal to the number of used storage cells, i.e. W in the arrangement shown in FIG. 6. Consequently, the register SIPO stores and retains the continually updated information regarding all primary pulses generated and mapped during the last W clock periods. This information is made available at W parallel outputs of the register SIPO; either all or only selected register SIPO outputs are connected to respective range-cell processors RCPs. For illustrative purposes, FIG. 6 shows output K of the register SIPO connected to a corresponding processor RCP.

A signal reflected back by an obstacle and received via the receive antenna RA is applied to the input amplifier IAM. When the matched filters, MF1, MF2, ..., MFM, are capable of processing only the baseband versions of waveforms w1($t$), w2($t$), ..., wM(t), some means for 'downconverting' (demodulation) will have to be incorporated into the amplifier IAM. Accordingly, a sinusoidal reference signal at a suitable frequency can be provided by the auxiliary oscillator OSC coupled to input CF of the amplifier LAM.

The bank of M matched filters, MF1, MF2, ..., MFM, is constructed to operate as follows. When any of the utilized waveforms, w1($t$), w2($t$), ..., wM(t), is applied to the common input of the matched filters, only the filter matched to this particular waveform will produce an unequivocal response; the residual responses of all remaining matched filters will be negligible. This specific property of the bank of matched filters is exploited to reliably recover from a received signal the value of a random index ID, assigned to each underlying pulse, during random pulse mapping.

The functions and operations performed by each range-cell processor RCP can be summarised as follows:

1. Each binary word supplied by a respective output of register SIPO is decomposed in a word decoder WDR into a signal PP indicating the pulse occurrence and a random index ID assigned to that pulse by the random index generator RIG during random pulse mapping.
2. The signal PP is applied to sampling input SS of a sampling circuit SCT, whereas the random index ID selects, via input IS of a channel selector CHS, the output of a matched filter corresponding to that index. Depending on the implementation, each matched filter may provide at its output either a multilevel (e.g., analog) signal, indicative of the strength of a received waveform, or just a binary signal, indicative of whether or not the strength of a received waveform is substantially greater than that of background noise and/or interference.
3. The thus-selected output of a respective matched filter is applied to the sampling circuit SCT and then sampled at the time instant coincident with the signal PP appearing at input SS. When a matched filter produces at its output a binary signal, the sampling circuit SCT can be reduced to a simple logic gate. It will, incidentally, be noted that the duration of the filter output will be dependent on the received waveform and the filter characteristics. The use of relatively long waveforms is acceptable if the characteristics are such that the filter output has a suitable duration.
4. The output of SCT is fed to an integrator INT which may be of 'integrate-and-dump' type, or 'running-average' ('moving-window') type. When the sampling circuit SCT is replaced by a logic gate, a suitably configured pulse counter can also perform the required integration.
5. The resultant level reached by the integrator INT is compared to a predetermined decision threshold DT in a comparator CMP. If the decision threshold DT has been exceeded, the presence of an obstacle will be declared in the range cell corresponding to the delay of the register SIPO output connected to the respective range-cell processor RCP.

As seen, the main function performed jointly by the processor RCP and the bank of matched filters is that of a waveform 'de-mapper' combined with that of a conventional correlation receiver. As a result, the decision outputs of all processors RCPs provide a comprehensive picture of the presence of potential obstacles in range cells constituting the field of view (FOV) of an obstacle-detection system, from which signals representing the ranges of such objects are generated. This 'snapshot' information can be utilized by a suitable obstacle-tracking system to produce warning signals to alert the driver, and also other signals used to initiate the operation of intended pre-crash actuators, such as air bags, brakes, etc. Instead of using a bank of individual range cell processors RCPs, a single processor RCP could be successively coupled to respective different outputs of the register SIPO so as to obtain serially decisions regarding presence of objects at respective ranges.

Where the system uses more than one type of symbol, a value representing the type of the generated symbol would be included in each binary word stored in the register SIPO. Also, there would be a respective bank of M matched filters, MF1, MF2, ..., MFM, and associated channel selector CHS, for each symbol type. Only (at most) one channel selector would provide an output at any given time, the particular channel selector being dependent on the received symbol. The collective outputs of the channel selectors can thus generate a value representing the detected symbol. This would be fed to one input of a standard correlator which receives at its other input the symbol type value from the word decoder WDR. The output of the correlator can then be sent to the sampling circuit SCT. This arrangement, involving multiple symbol types, facilitates improvement of auto-correlation and cross-correlation functions and thus improves performance.

FIG. 7 is a block diagram of one possible structure of the pulse packet generator PPG. The generator comprises a sequential state module SSM, a state decoder STD, a random gap generator RGG and a clock generator CKG.

During the system operation, the sequential state module SSM changes its state successively at the time instants determined by clock pulses CLK supplied by the clock generator CKG. The total number NS of distinct states of the sequential state module SSM should be at least equal to the span $L_{max}$ of the longest primary pulse packet used by the system; hence $$NS=2^K \geq L_{max}$$

where K is the number of flip-flops utilized by the sequential state module SSM.

The sequential state module SSM is arranged to operate cyclically, each cycle comprising NU distinct states selected in some convenient manner from the total number $NS=2^K$ of available distinct states. Among those NU distinct states, there are N predetermined states representing the positions of pulses in each pulse packet to be generated.

The function of the sequential state module SSM can be implemented by a conventional binary counter, by a shift register with a suitable feedback or by a similar sequential state machine well known to those skilled in the art.

The state decoder STD is driven by a K-bit output of the sequential state module SSM. The state decoder STD has two outputs: one output supplies a composite pulse train CPT, whereas the other produces an end-of-packet EOP pulse. For example, an end-of-packet EOP pulse may coincide with the trailing pulse of every pulse packet. All functions of the state decoder STD can be implemented by a combinational logic or by a suitably programmed read-only memory.

The random gap generator RGG appends a random gap to the trailing pulse of every primary pulse packet being produced. Each cycle of the repetitive operation of the random gap generator RGG is initiated by an end-of-packet EOP pulse supplied by the state decoder STD. The end-of-packet pulse EOP causes a random selector RS to select at random one of a plurality of delay values stored in a delay store memory DS. The selected delay value is provided to a delay circuit DLY to cause a corresponding number of clock pulses provided by the clock generator CKG to be inhibited. The output CRG of the random gap generator RGG thus supplies a sequence of clock pulses in which a random number of consecutive pulses are missing. As a result, the operation of the sequential state module SSM is suspended during a random time interval equal to the duration of the random gap. Preferably, the duration of each random gap is uniformly distributed, and the random gaps are formed independently of each other.

Although the pulse packet generator PPG of FIG. 7 repeatedly generates the same pulse packet, as indicated in the earlier application it could instead be arranged such that successive pulse packets are randomly selected from a predetermined set thereof.

The arrangement described above repeatedly produces pulse packets of finite length, and a mapping process is used to substitute waveforms for the individual pulses. Various modifications are possible.

FIG. 8 shows a number of alternative symbol sequences which could be used in place of pulse packets. In FIG. 8(a), the primary symbol sequence is a train of non-coherent pulses, the pulses being of the same (unit) duration. The gaps between the pulses are a multiple of the unit duration, modified by varying amounts so as to obtain a narrow autocorrelation sequence. The random encoder would substitute, in place of each pulse, a waveform randomly selected from a single set thereof.

FIG. 8(b) shows an alternative primary symbol sequence comprising a train of binary pulses separated by gaps. In the arrangement shown, the pulses have values of +1 and −1. The random encoder responds to each +1 pulse by selecting randomly from a first set of waveforms, and to each −1 pulse by selecting randomly from a second set of waveforms. Preferably, the decoder reconstructs a bi-polar waveform from the received signal, this bi-polar waveform then being subject to correlation with the transmitted waveform stored in the memory MEM.

As a modification, the pulse train can include pulses of more than two values, each different value giving rise to a selection from a respective waveform set.

FIG. 8(c) shows a further possible primary symbol sequence, in the form of discrete pulses separated by gaps, each discrete pulse containing a number of contiguous sub-pulses (for example a Barker code) which each sub-pulse can have one of two different values. In this case, the random encoder will substitute a randomly-selected waveform for each sub-pulse, the waveform being selected from a set dependent upon the value of the sub-pulse.

FIG. 8(d) is an example of a primary symbol sequence in the form of a continuous signal, in this case a pseudo-random binary sequence. Of course other sequences, such a ternary or quaternary pseudo-random sequences are alternatively possible.

In the arrangements described above, there is a fixed set of waveforms for each symbol to be transmitted, and a random selection from this set is made each time the respective symbol is transmitted. In an alternative arrangement, the set of waveforms used to represent a particular symbol is altered (preferably at random) from time to time.

An example of this will be described with reference to the successive transmission of a composite pulse containing a seven-element Barker sequence of sub-codes of the form:

+++−−−+−

Assume that the system has at its disposal 20 waveforms: w1, w2, ..., w20. Prior to transmitting each composite pulse, the system selects randomly, e.g., three of the waveforms to represent symbol +, and three different symbols to represent symbol −. For example, a system under consideration may select w3, w12, w19 to represent symbol +, and w4, w5, w10 to represent symbol −. Information representing the selected sets is stored in a memory. Next, the system transmits the composite pulse, choosing randomly one from {w3, w12, w19} to transmit each symbol +, and choosing randomly one from {w4, w5, w10} to transmit each symbol −.

In the receiver, the contents of the memory (after being subjected to an appropriate delay) are used to configure the outputs of the matched filters, such that the outputs of filters matched to w3, w12 and w19 will be connected (ORed) to provide symbol output +; similarly, the outputs of filters matched to w4, w5 and w10 will be ORed to provide symbol output −. The decoder thus will provide an output sequence of + and − symbols (each symbol being determined by which of the six matched filters generates the greatest output). A correlator will use a delayed version of the transmitted primary sequence +++−−−+− together with the decoder output sequence to determine the value of cross-correlation.

As a result, the operation of correlation is performed on the primary sequence (with narrow autocorrelation) and its version reconstructed from received waveforms, utilizing the auxiliary information regarding the waveforms used for random encoding.

The next composite pulse may then be sent with a different random selection of waveforms.

It is anticipated that, in use of the present invention, the primary symbol sequence will be generated in the form of a signal, and then subjected to random encoding. However, this is not essential. The randomly-selected waveforms could be produced directly, at their required timings, without needing to generate the primary symbol sequence as a separate preliminary operation. (It would nevertheless be possible to deduce for each waveform sequence a nominal primary symbol sequence, and its autocorrelation sequence, corresponding to the timing of the waveform generation.)

The obstacle-detection system of FIG. 5 may be mounted on a movable platform (such as a vehicle or vessel), or on a stationary platform to detect the approach of a movable object. The system can be a collision-warning system arranged to generate a warning signal in response to detection of an object. Additionally or alternatively, the system may be a ranging aid for detecting the range of an obstacle and for generating a signal indicative of the range.

It is desirable for the packets of transient signals generated by multiple systems to satisfy the cross-correlation constraint mentioned above, and in particular for the cross-correlation functions to have values which are all small compared with the maximum values of each autocorrelation function. Furthermore, because of the desirability for each system to have the same structure, it is preferable for these conditions to apply to the cross-correlation properties of different packets produced by an individual system. This, however, can be achieved by virtue of the techniques described above, particularly the provision of pulse mapping, random intervals between packets and timing sequences selected to have good correlation properties.

It will be clear from the above description that references to the form of transient signals (e.g. single pulses or waveforms) are intended to relate to the baseband form of those signals; clearly the detailed structure of transmitted waveforms may differ if the transient signals are used for carrier modulation for transmission.

The term "random" is intended herein to include, without limitation, not only purely random, non-deterministically generated signals, but also pseudo-random and/or deterministic signals such as the output of a shift register arrangement provided with a feedback circuit as used in the prior art to generate pseudo-random binary signals, and chaotic signals.

The embodiments described herein can be implemented using dedicated hardware, incorporating for example digital signal processors, or using suitably-programmed general-purpose computers.

Although some suitable formats of modulation, or waveform-for-pulse substitution, are currently regarded as preferable, other attributes of waveforms and wave phenomena (e.g., polarization of electromagnetic waves) can also be employed for 'watermarking' the interrogating signals.

The foregoing description of preferred embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilize the invention in various embodiments suited to the particular use contemplated.

The invention claimed is:

1. A method of generating a sequence of waveforms, wherein:
   the waveforms are generated at timings corresponding to pulses in a primary sequence having a narrow autocorrelation sequence, said pulses being arranged in packets of predetermined configuration with gaps between the packets, and the timings of the pulses within each packet being such that each packet has a narrow autocorrelation sequence;
   and wherein each waveform is randomly selected from a set of waveforms with respective predetermined characteristics.

2. A method as claimed in claim 1, wherein successive pulse packets are randomly selected from a predetermined set of pulse packets.

3. A method as claimed in claim 1, wherein the gaps between pulse packets are of randomly-selected length.

4. A method as claimed in claim 1, wherein the minimum gap between adjacent pulses in a packet exceeds a predetermined value, whereby the autocorrelation sequence of the packet exhibits a zero value for consecutive relative shifts which do not exceed a predetermined limit.

5. A method as claimed in claim 1, in which the waveforms of said set are substantially mutually orthogonal.

6. A method as claimed in claim 1, wherein the waveforms have respective different frequencies.

7. A method of generating a sequence of waveforms, each waveform being generated at a liming corresponding to that of a respective symbol in a primary sequence having a narrow autocorrelation sequence, the primary symbol sequence including symbols of a plurality of types, wherein each waveform is randomly selected from one of a plurality of sets of waveforms having respective predetermined characteristics, the set from which the waveform is selected being dependent on the type of the respective symbol.

8. A method as claimed in claim 7, in which the primary symbol sequence comprises a first pulse sequence interleaved with a second pulse sequence which is a time-reversed replica of the first pulse sequence, at least a substantial number of the waveforms corresponding to each pulse sequence being distinguishable from those corresponding to the other pulse sequence.

9. A method of generating a sequence of waveforms, the waveforms being generated at timings corresponding to symbols in a primary sequence having a narrow autocorrelation function, wherein each waveform is randomly selected from a set of waveforms with respective predetermined characteristics.

10. A method of detecting an object, the method comprising transmitting a sequence of waveforms generated using a method as claimed in claim 9, receiving reflections of the transmitted waveforms and determining matches between the transmitted and received waveforms.

11. A method as claimed in claim 10, wherein the transmitted waveforms are selected from sets each corresponding to a respective symbol type in the primary symbol sequence, the method including decoding the received waveforms to obtain a received symbol sequence and cross-correlating the primary symbol sequence with the received symbol sequence to determine matches between the transmitted and received waveforms.

12. A method as claimed in claim 10, including the step of storing data indicating which waveforms have been randomly selected, and using the stored data to determine matches between the transmitted and received waveforms.

13. Apparatus for generating a sequence of waveforms, the apparatus being arranged to operate in accordance with a method as claimed in 1.

14. Obstacle-detection apparatus for use in a multi-user environment, the apparatus being arranged to operate in accordance with a method as claimed in claim 10.

15. Obstacle-detection apparatus as claimed in claim 14, including means for providing a signal indicative of the range of a detected object.

16. Obstacle-detection apparatus as claimed in claim 14 for use in a vehicle or vessel to detect potential collisions.

17. A collision-warning system for a vehicle or vessel, the system comprising an obstacle-detection apparatus as claimed in claim 16 and means for generating a warning signal in response to obstacle detection.

18. A ranging aid for a vehicle or vessel, the system comprising an obstacle-detection apparatus as claimed in claim 16 and means for generating a signal indicative of the range of a detected obstacle.

* * * * *